(12) United States Patent
Lo et al.

(10) Patent No.: US 10,989,956 B2
(45) Date of Patent: Apr. 27, 2021

(54) DISPLAY DEVICE

(71) Applicant: Coretronic Corporation, Hsin-Chu (TW)

(72) Inventors: Yi-Chien Lo, Hsin-Chu (TW); Hsin-Hsiang Lo, Hsin-Chu (TW); Chuan-Chung Chang, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 124 days.

(21) Appl. No.: 16/264,712

(22) Filed: Feb. 1, 2019

(65) Prior Publication Data
US 2019/0250459 A1     Aug. 15, 2019

(30) Foreign Application Priority Data

Feb. 9, 2018 (CN) .......................... 201810133918.1

(51) Int. Cl.
*G02F 1/1335*   (2006.01)
*G02F 1/13357*  (2006.01)
(Continued)

(52) U.S. Cl.
CPC .... *G02F 1/133536* (2013.01); *G02F 1/13362* (2013.01); *G02F 1/133526* (2013.01);
(Continued)

(58) Field of Classification Search
CPC ................ G02B 6/00; G02B 30/00–60; G02B 6/0011–0038; G02B 6/0048;
(Continued)

(56) References Cited

U.S. PATENT DOCUMENTS 4,798,448 A * 1/1989 van Raalte .......... G02F 1/13362
                                                                349/62
8,189,263 B1   5/2012 Wang et al.
(Continued)

FOREIGN PATENT DOCUMENTS

CN    1139761 A    1/1997
CN    1922539 A    2/2007
(Continued)

OTHER PUBLICATIONS

Hong Hua et al., A 3D integral imaging optical see-through head-mounted display, Optics Express, Jun. 2, 2014, vol. 22, No. 11, Optical Society of America.
(Continued)

*Primary Examiner* — Michael H Caley
*Assistant Examiner* — Jonathan Y Jung

(57) ABSTRACT

A display device includes a light source, a light-directing element, a reflective display element, and a microlens array. The light-directing element is disposed on the transmission path of a lighting beam provided by the light source for projecting the lighting beam toward the first direction. The reflective display element includes a plurality of micro-image units, wherein each micro-image unit converts the lighting beam projected from the light-directing element into an sub-image beam and reflects the sub-image beam. The microlens array is disposed on the transmission path of the sub-image beams, wherein the light-directing element is located between the microlens array and the reflective display element. The microlens array includes a plurality of microlenses. Each sub-image beam pass throughs the light-directing element and is projected to an aperture by the corresponding microlens, and the sub-image beams pass through the aperture to form an image beam.

14 Claims, 10 Drawing Sheets

(51) Int. Cl.
*G02B 30/00* (2020.01)
*H04N 9/31* (2006.01)
*G02F 1/1362* (2006.01)
*F21V 8/00* (2006.01)

(52) U.S. Cl.
CPC ...... *G02F 1/136277* (2013.01); *G02B 6/0011* (2013.01); *G02B 6/0015* (2013.01); *G02B 6/0035* (2013.01); *G02B 6/0038* (2013.01); *G02B 6/0048* (2013.01); *G02B 30/00* (2020.01); *G02F 1/13355* (2021.01); *G02F 1/133615* (2013.01); *G02F 2203/02* (2013.01); *H04N 9/3105* (2013.01)

(58) Field of Classification Search
CPC ........... G02F 1/133553; G02F 2203/02; G02F 1/133526; G02F 1/133555; G02F 1/133615; H04N 13/307; H04N 9/3105
See application file for complete search history.

(56) References Cited

U.S. PATENT DOCUMENTS

| | | | |
|---|---|---|---|
| 8,432,614 | B2 | 4/2013 | Amitai |
| 9,239,453 | B2 | 1/2016 | Cheng et al. |
| 9,341,883 | B2 | 5/2016 | Li et al. |
| 9,664,903 | B2 | 5/2017 | An et al. |
| 2002/0141192 | A1* | 10/2002 | Tiao .................. G02B 27/0961 362/299 |
| 2005/0057793 | A1 | 3/2005 | Starkweather et al. |
| 2006/0250696 | A1 | 11/2006 | McGuire |
| 2007/0171493 | A1* | 7/2007 | Nakanishi ......... G02F 1/134309 359/15 |
| 2015/0003035 | A1* | 1/2015 | Li ..................... G03B 21/2066 362/19 |
| 2015/0049390 | A1 | 2/2015 | Lanman et al. |
| 2015/0177519 | A1* | 6/2015 | Cakmakci .......... G02B 27/0172 359/631 |
| 2015/0346495 | A1 | 12/2015 | Welch et al. |
| 2016/0070104 | A1 | 3/2016 | Yang |
| 2016/0295202 | A1 | 10/2016 | Evans et al. |
| 2017/0235143 | A1 | 8/2017 | Chi et al. |

FOREIGN PATENT DOCUMENTS

| | | |
|---|---|---|
| CN | 101943845 A | 1/2011 |
| CN | 104251464 A | 12/2014 |
| CN | 104832883 A | 8/2015 |
| CN | 105276479 A | 1/2016 |
| CN | 106033160 A | 10/2016 |
| CN | 106154640 A | 11/2016 |
| CN | 106605171 A | 4/2017 |
| CN | 107305291 A | 10/2017 |

OTHER PUBLICATIONS

Andrew Maimone et al., Holographic Near-Eye Displays for Virtual and Augmented Reality, ACM Transactions on Graphics, vol. 36, No. 4, Article 85. Publication date: Jul. 2017.
David Dunn et al., Membrane AR: Varifocal, Wide Field of View Augmented Reality Display from Deformable Membranes, SIGGRAPH '17 Emerging Technologies, Jul. 30-Aug. 3, 2017, Los Angeles, CA, USA.
Kaan Aksit et al., Varifocal Virtuality: a Novel Optical Layout for Near-Eye Display, SIGGRAPH '17 Emerging Technologies, Jul. 30-Aug. 3, 2017, Los Angeles, CA, USA.

* cited by examiner

DISPLAY DEVICE

CROSS-REFERENCE TO RELATED APPLICATION

THIS APPLICATION CLAIMS THE PRIORITY BENEFIT OF CHINA APPLICATION (CN201810133918.1 FILED ON 2018 Feb. 9). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a display device for displaying 3D image.

BACKGROUND OF THE INVENTION

The light field display device is a display device using light field display technology to produce stereoscopic images. The light field image produces a real image or a virtual image on an imaging surface through a microlens array. Therefore, the observer can see the light field image with depth feeling at a particular distance.

Generally, when people observe the objects within about 10 meters, and the monocular focuses on objects at different distances, there will be accommodation. At this time, both eyes will also rotate on the visual axis at the same time. Therefore, the objects seen by the two eyes will produce parallax and synthesize a stereoscopic image in the brain, which is called "Vergence", that is, non-conjugative movement (opposite movement) of the two eyes in opposite directions. However, the current head-mounted display provides the 2D image, which may result in a situation where the monocular focus is not matched with the binocular focus. This will cause dizziness and discomfort, and produce virtual reality vomiting, this is called vergence-accommodation conflict. The light field display device is a display device that generates the stereoscopic images using the light field display technology. The light field image produces a real image or a virtual image on the imaging surface through a microlens array, so that the observer can see the light field image with depth feeling at a specific distance. The image with depth feeling can reduce the impact of vergence-accommodation conflict.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, which can reduce the thickness and weight of the display device and improve the field of view and the sharpness of the image.

Other objectives and advantages of the invention can be further understood from the technical features disclosed in the invention.

In order to achieve one or a part or all of the above objectives or other objectives, an embodiment of the invention provides a display device, which includes a light source, a light-directing element, a reflective display element, a microlens array, and a first lens. The light source is adapted to provide a lighting beam. The light-directing element is disposed on the transmission path of the lighting beam for projecting the lighting beam toward the first direction. The reflective display element is configured to receive the lighting beam projected from the light-directing element. The reflective display element includes a plurality of micro-image units, wherein each micro-image unit converts the lighting beam into an sub-image beam and reflects the sub-image beam. The microlens array is disposed on the transmission path of the sub-image beams, wherein the light-directing element is located between the microlens array and the reflective display element. The microlens array includes a plurality of microlenses, and the microlenses correspond to the micro-image units, respectively. The first lens is disposed on one side of the microlens array, wherein the microlens array is located between the first lens and the light-directing element, each sub-image beam pass through the light-directing element and is projected to the first lens by the corresponding microlens and transmitted to an aperture, and the sub-image beams pass through the aperture to form an image beam.

By setting the light-directing element, the display device of the embodiment of the invention can greatly reduce the thickness and weight of the display device and improve the field of view and the sharpness of the image.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
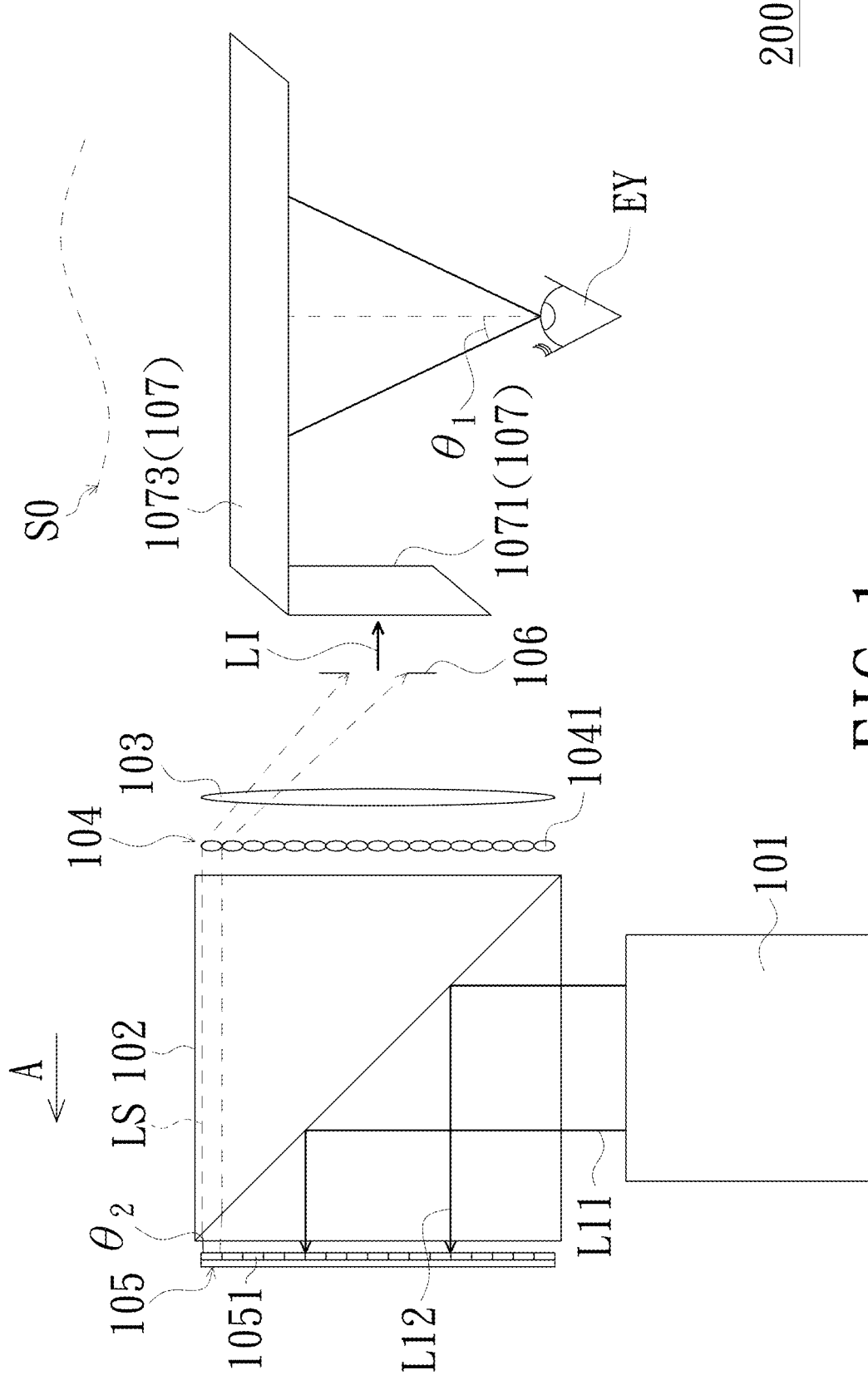
FIG. 1 is a schematic view of a display device in accordance with an embodiment of the invention.

FIG. 1 is a schematic view of a display device in accordance with an embodiment of the invention. Referring to FIG. 1, the display device 200 of the embodiment includes a light source 101, a light-directing element 102, a reflective display element 105, and a microlens array 104. The light source 101 is adapted to provide a lighting beam L11. The light-directing element 102 is disposed on the transmission path of the lighting beam L11 for projecting the lighting beam L11 toward a first direction A to become the lighting beam L12. The reflective display element 105 is configured to receive the lighting beam L12 projected from the light-directing element 102. The reflective display element 105 includes a plurality of micro-image units 1051, wherein each micro-image unit 1051 converts the lighting beam L12 into an sub-image beam LS and reflects the sub-image beam LS (FIG. 1 shows the sub-image beam LS emitted by the micro-image unit 1051 at the top edge of the reflective display element 105). The microlens array 104 is disposed on the transmission path of the sub-image beams LS, wherein the light-directing element 102 is located between the microlens array 104 and the reflective display element 105. The microlens array 104 includes a plurality of microlenses 1041, and the microlenses 1041 correspond to the micro-image units 1051, respectively. Each sub-image beam LS pass through the light-directing element 102 and is projected to an aperture 106 by the corresponding microlens 1041. The sub-image beams LS pass through the aperture 106 to form an image beam LI. The display device 200 further includes a first lens 103. The first lens 103 is disposed on one side of the microlens array 104, wherein the microlens array 104 is located between the first lens 103 and the light-directing element 102. The first lens 103 is configured to converges the sub-image beams LS penetrating the microlens array 104 and projects the sub-image beams LS to the aperture 106 to form the image beam LI.

In addition, the display device 200 could further include an optical waveguide element 107. In the embodiment, the microlenses 1041 project the sub-image beams LS and converge the sub-image beams LS to the aperture 106. The sub-image beams LS pass through the aperture 106 and become the image beam LI, and the optical waveguide element 107 is located on the transmission path of the image beam LI for transmitting the image beam LI to the eye EY of the user. In the embodiment, the eye EY of the user can see a virtual image S0, and the user can see the virtual image with depth feeling. In this embodiment, the optical waveguide element 107 includes optical waveguide elements 1071 and 1073 as an example, but the invention does not limit the number of optical waveguide elements, and one optical waveguide element could also achieve the effects of the invention. As long as the optical waveguide element 107 is located on the transmission path of the image beam LI and the optical waveguide element 107 can transmit the image beam LI to the eye EY of the user. By setting the optical waveguide element 107, the display device 200 of the embodiment, for example, could be applied to augmented reality or virtual reality. The display device 200 of the embodiment may be a light-field display or a near-eye display, to which the invention is not limited. In the embodiment, the setting of the light-directing element 102 can simplify the light path and structure of the display device 200 and reduce its thickness and weight.

In the embodiment, the reflective display element 105 is exemplified by the LCoS (Liquid Crystal On Silicon), and the reflective display element 105 is configured to convert the lighting beam L12 into a plurality of sub-image beams LS. The plurality of micro-image units 1051 of the reflective display element 105 are composed of a plurality of liquid crystal cells, to which the invention is not limited. The reflective display element may be also a DMD (Digital Micromirror Device). In the embodiment, the light-directing element 102 is exemplified by a partially penetrating partially reflective element, so that the light-directing element 102 can project the partial lighting beam L11 toward the first direction A to become the lighting beam L12. The light-directing element 102 lets the sub-image beams LS to pass through and transmit to the microlens array 104. However, the invention does not limit the kind or form of the reflective display element 105 and the light-directing element 102. As long as the light-directing element 102 can project the lighting beam L11 toward the first direction A and allow the sub-image beams LS to pass through, and the reflective display element 105 can convert the lighting beam L12 into a plurality of sub-image beams LS. The light-directing element 102 is, for example, a light splitter, or the light-directing element 102, for example, has a metal grating layer that allows 50% of incident light beam to pass through and 50% of incident light beam to reflect.

In detail, the lighting beam L11 provided by the light source 101 is nearly a collimated light beam, and the lighting beam L12 projected by the light-directing element 102 toward the first direction A is also nearly a collimated light beam. Since the lighting beam L12 is nearly the collimated light beam, the divergence angle of each sub-image beam LS reflected by each micro-image unit 1051 can be controlled within a specific angle range, and the sharpness of the image beam LI can be improved.

Incidentally, the light source 101, for example, could be a laser light source, a light-emitting diode (LED) light source, a micro light-emitting diode light source, or an organic light-emitting diode (OLED) light source, to which the invention does not limit the kind or type of light source 101.

In the embodiment, the aperture 106 is defined as the position where the sub-image beams LS converged, that is, the position of the image beam LI formed. The image beam at the aperture 106 that the sub-image beams LS converged has the smallest image beam cross-sectional area and forms the image beam LI. In the embodiment, no physical aperture device is provided at the position where the sub-image beams LS are projected and converged by the microlens array 104, to which the invention is not limited. In other embodiments of the invention, the aperture 106 could be a physical aperture, such as a shield sheet with an opening. The physical aperture can effectively block the stray light around the image beam LI, and reduce the ghost image and/or stray light generated when the eye EY of the user views the image beam LI.

In the embodiment, by the setting of the first lens 103, the sub-image beam LS can be deflected at a large angle by the first lens 103, the incident angle θ1 entering the eye EY of the user after passing through the optical waveguide element 107 will be much greater than the outgoing angle θ2 of the sub-image beam LS exiting the micro-image unit 1051. Therefore, the overall thickness of the display device 200 does not need to be too thick to achieve the advantage of a large field of view (FOV). In addition, since the sub-image beam LS can be deflected at a large angle by the first lens 103, the microlenses 1041 of the microlens array 104 do not need to adopt a special design of the inclined optical surfaces, which can reduce the cost and simplify the structure of the display device 200.

Figure 2A:
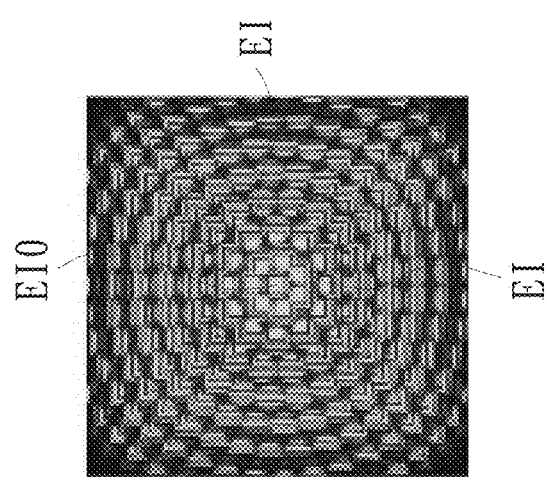
FIG. 2A is a schematic view of a plurality of sub-images respectively displayed by a plurality of micro-image units of a reflective display element of the display device in the embodiment shown in FIG. 1.
Figure 2B:
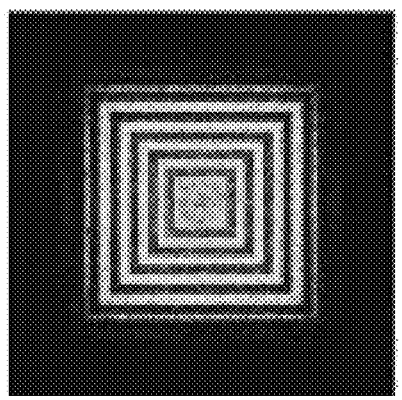
FIG. 2B is a schematic view of an image observed by the eye of the user through the display device of the embodiment shown in FIG. 1.

Referring to FIGS. 2A and 2B. FIG. 2A is a schematic view of a plurality of sub-images respectively displayed by a plurality of micro-image units 1051 of the reflective display element 105 of the display device 200 in the embodiment shown in FIG. 1. FIG. 2B is a schematic view of an image observed by the eye EY of the user through the display device 200 of the embodiment shown in FIG. 1. The sub-images EI0 and EI shown in FIG. 2A are an example of the sub-image beams LS provided by the micro-image units 1051 of the reflective display element 105. As shown in FIG. 2A, in the embodiment, a plurality of the micro-image units 1051 display one sub-image EI0 and a plurality of sub-images EI, wherein the sub-image EI0 is defined as a central sub-image and the sub-images EI surround the central sub-image (i.e., sub-image EI0). In the embodiment, after the sub-images EI0 and EI pass through the light-directing element 102 and are projected to the aperture 106 by the corresponding microlenses 1041 and the first lens 103, and then transmitted to the eye EY of the user through the optical waveguide element 107, so that the user can view the image shown in FIG. 2B. Thus, the display device 200 of the embodiment enables the user to view the image with depth perception through the arrangement of the light source 101, the light-directing element 102, the first lens 103, the microlens array 104, the reflective display element 105, and the optical waveguide element 107. However, the sub-images EI0 and EI generated by the reflective display element 105 in FIG. 2A are merely examples, to which the invention is not limited.

Figure 3:
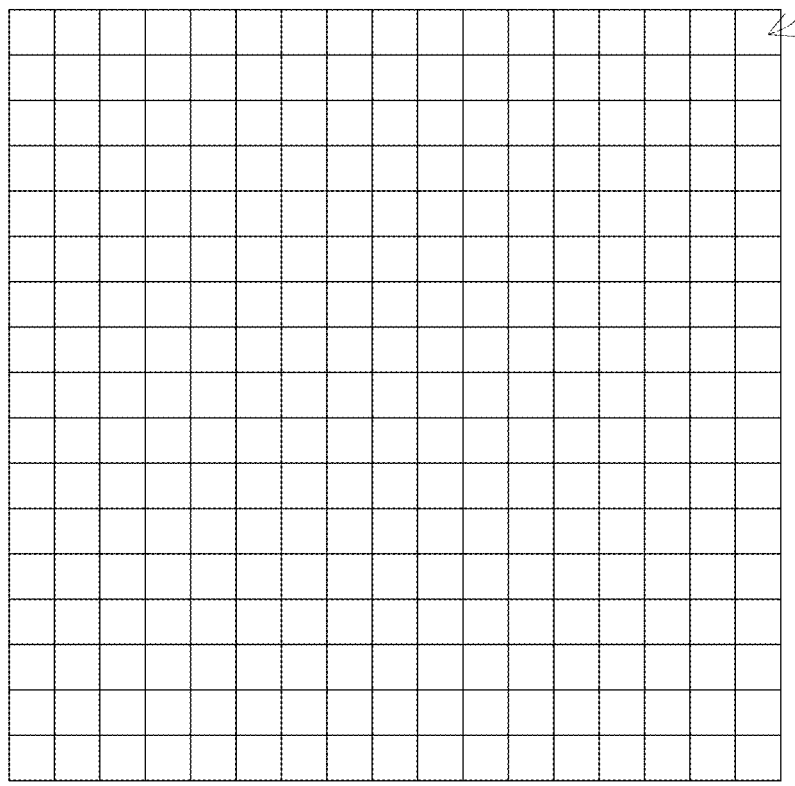
FIG. 3 is a schematic view of a microlens array of the display device of the embodiment shown in FIG. 1.

FIG. 3 is a schematic view of the microlens array 104 of the display device 200 of the embodiment shown in FIG. 1. Referring to FIG. 3, in the embodiment, the microlenses 1041 of the microlens array 104 are arranged in a matrix manner for the exemplary description, to which the invention is not limited. In the embodiment, the focal length of each microlens 1041 is the same for example. However, in other embodiments, the focal lengths of the microlenses 1041 could be different. In the front view, the shape of the microlenses 1041 are, for example, a rectangle, but in the lateral view, the shape of the microlenses 1041 are the lens shape having curved surfaces.

Figure 4A:
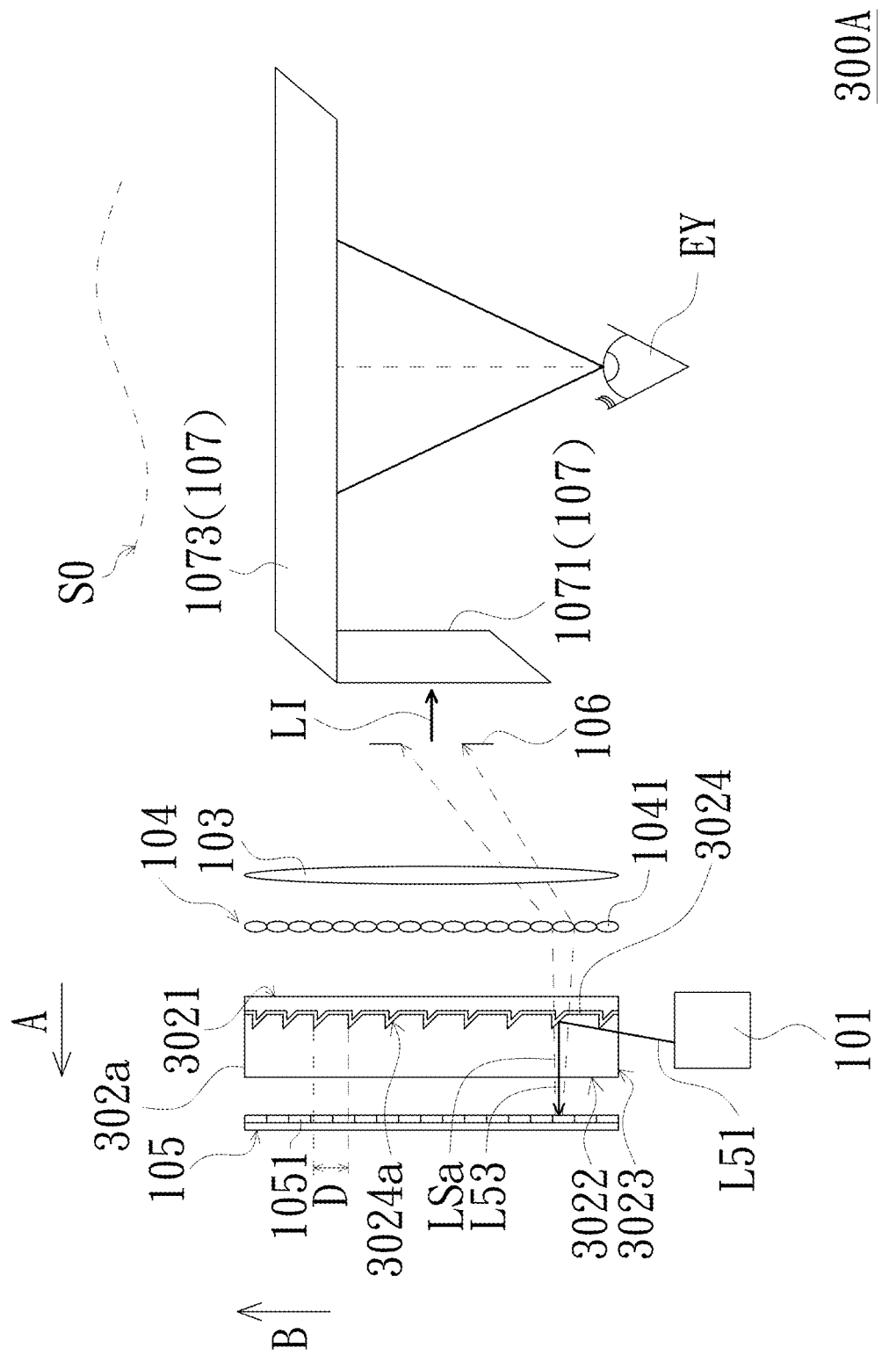
FIG. 4A is a schematic view of a display device in accordance with another embodiment of the invention.

FIG. 4A is a schematic view of a display device in accordance with another embodiment of the invention. Referring to FIG. 4A, in the embodiment, the display device 300A includes a light source 101, a light-directing element 302a, a microlens array 104, a reflective display element 105, and an optical waveguide element 107. The display device 300A of the embodiment has a similar structure and function as the display device 200 shown in FIG. 1. The embodiment shown in FIG. 4A is different from the embodiment shown in FIG. 1 in that the light-directing element 302a includes a first surface 3021, a second surface 3022 opposite to the first surface 3021, and an incident surface 3023 connecting the first surface 3021 and the second surface 3022, wherein the second surface 3022 is disposed between the reflective display element 105 and the first surface 3021. The light-directing element 302a further includes a reflective element 3024, the reflective element 3024 includes a plurality of reflective surfaces 3024a inclined with respect to the second surface 3022, and the reflective surfaces 3024a are arranged along a second direction B at a spacing distance D, to which the invention is not limited. In other embodiments, as the distance in the second direction B increases, the spacing distances D between the reflective surfaces 3024a decreases. The lighting beam L51 provided by the light source 101 enters the light-directing element 302a through the incident surface 3023. The reflective surfaces 3024a of the reflective element 3024 are configured to change the transmission direction of at least a portion of the lighting beam L51, so that a portion of the lighting beam L51 is projected to the reflective display element 105 to become the lighting beam L53. Therefore, the purpose of making the lighting beam L51 provided by the light source 101 to be projected to the reflective display element 105 is achieved. Since there are spacing distances D between the reflective surfaces 3024a, the sub-image beams LSa reflected by the reflective display element 105 can pass through to the microlens array 104. The light-directing element 302a including a plurality of reflective surfaces 3024a can reduce the volume of the display device 300A.

In the embodiment, the light-directing element 302a, for example, could be a light guide plate, and the reflective element 3024, for example, could be a beam splitter, to which the invention is not limited. In the embodiment, the reflective surfaces 3024a are arranged at the spacing distance D as an example, but it is not excluded that the reflective surfaces 3024a could be arranged at different spacing distances.

Figure 4B:
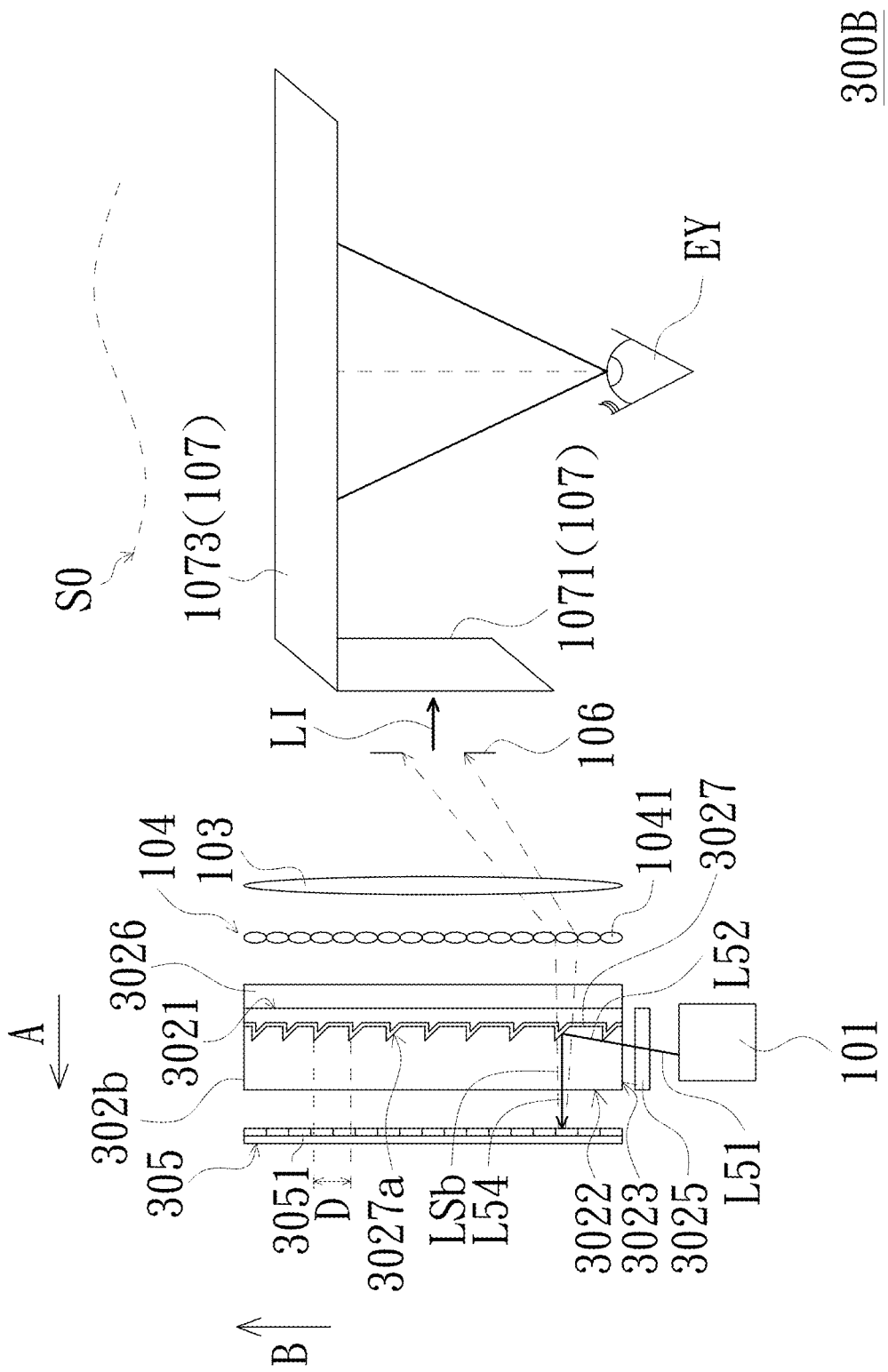
FIG. 4B is a schematic view of a display device in accordance with still another embodiment of the invention.

FIG. 4B is a schematic view of a display device in accordance with still another embodiment of the invention.

Referring to FIG. 4B, in the embodiment, the display device 300B includes a light source 101, a light-directing element 302b, a microlens array 104, a reflective display element 305, and an optical waveguide element 107. The display device 300B of the embodiment has a similar structure and function as the display device 300A shown in FIG. 4A. The embodiment shown in FIG. 4B is different from the embodiment shown in FIG. 4A in that the reflective element 3027 of the light-directing element 302b is a polarizing beam splitter film, and the reflective display element 305 is a LCoS (Liquid crystal on silicon) display device. The lighting beam provided by the light source 101 includes a first polarized light beam and a second polarized light beam, wherein the polarization states of the first polarized light beam and the second polarized light beam are perpendicular to each other. The reflective surfaces 3027a of the reflective element 3027 reflect the first polarized light beam of the lighting beam and project toward the reflective display element 305. The micro-image units 3051 of the reflective display element 305 change the polarization state of the sub-image beams LSb reflected after converting the lighting beam into the sub-image beams LSb, so that the sub-image beams LSb reflected have the same polarization state as the second polarized light beam. The reflective element 3027 lets the light beam with the same polarization as the second polarized light beam to pass through, so that the sub-image beams LSb could pass through the light-directing element 302b and transmit to the microlens array 104. Therefore, the image display can be realized by the reflective display element 305 of the LCoS in this embodiment.

In the embodiment, the display device 300B could further include a polarizer 3025 and a reflective polarizer 3026, wherein the polarizer 3025 is disposed between the light source 101 and the light-directing element 302b, and the first surface 3021 is located between the reflective polarizer 3026 and the second surface 3022. The polarizer 3025 lets the light beam with the same polarization state as the first polarized light beam to pass through, and the reflective polarizer 3026 lets the light beam with the same polarization state as the second polarized light beam to pass through and reflects the light beam with other polarization states. After the lighting beam L51 provided by the light source 101 pass through the polarizer 3025, the polarizer 3025 lets the first polarized light beam to pass through to become the lighting beam L52. The reflective surfaces 3027a of the reflective element 3027 reflect the lighting beam L52, so that the lighting beam L52 is projected toward the reflective display element 305 to become the lighting beam L54. After the micro-image units 3051 of the reflective display element 305 convert the lighting beam L54 into the sub-image beams LSb, the polarization state of the sub-image beams LSb reflected will be changed, so that the sub-image beams LSb reflected have the same polarization state as the second polarized light beam. Therefore, the sub-image beams LSb could transmit to the microlens array 104 through the reflective polarizer 3026. The reflective polarizer 3026 reflects the light beam with the polarization state different from the second polarized light beam, which can improve the utilization of the lighting beam.

Figure 5A:
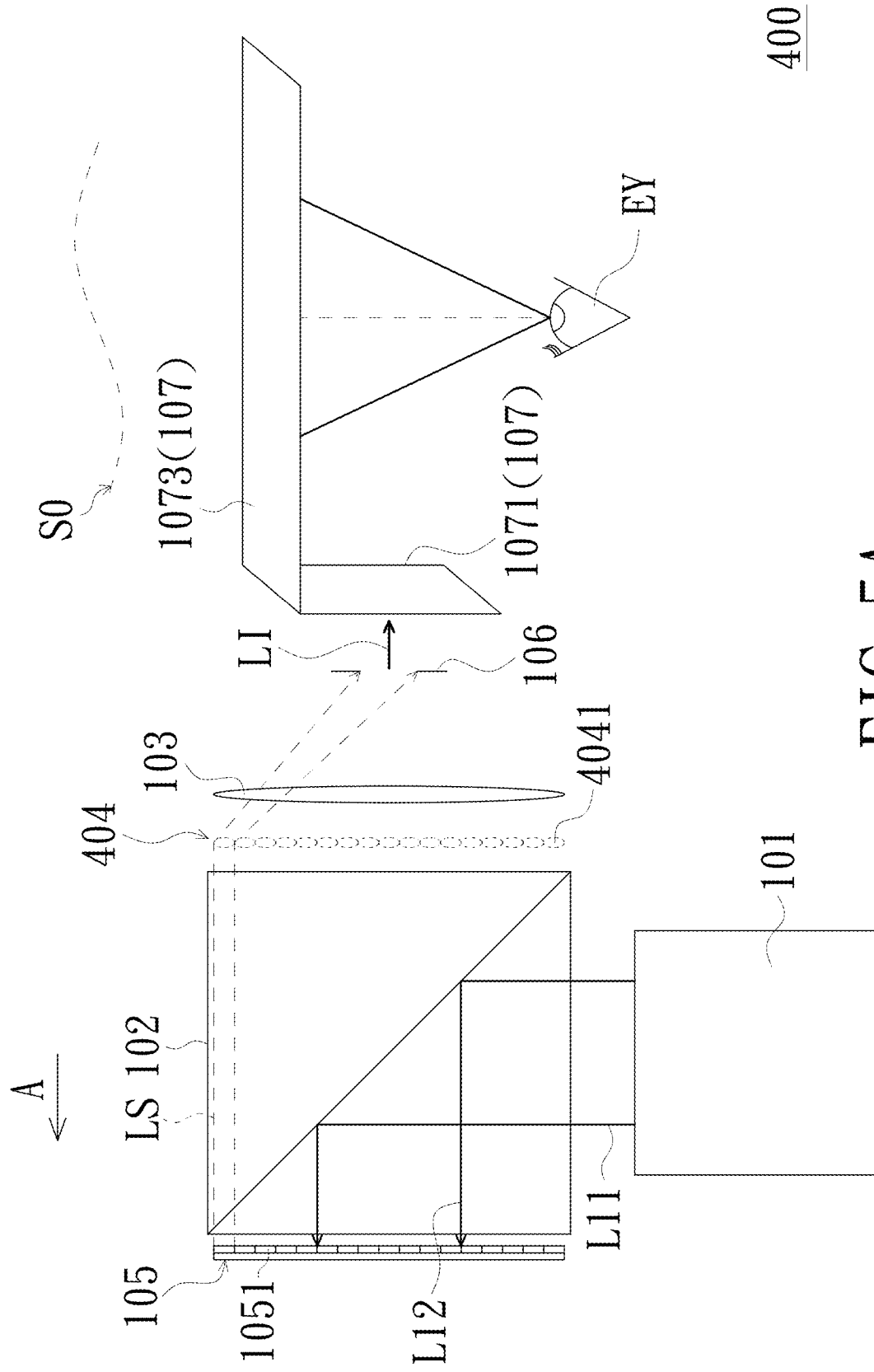
FIG. 5A and FIG. 5B are schematic views of a display device in accordance with still another embodiment of the invention.
Figure 5B:
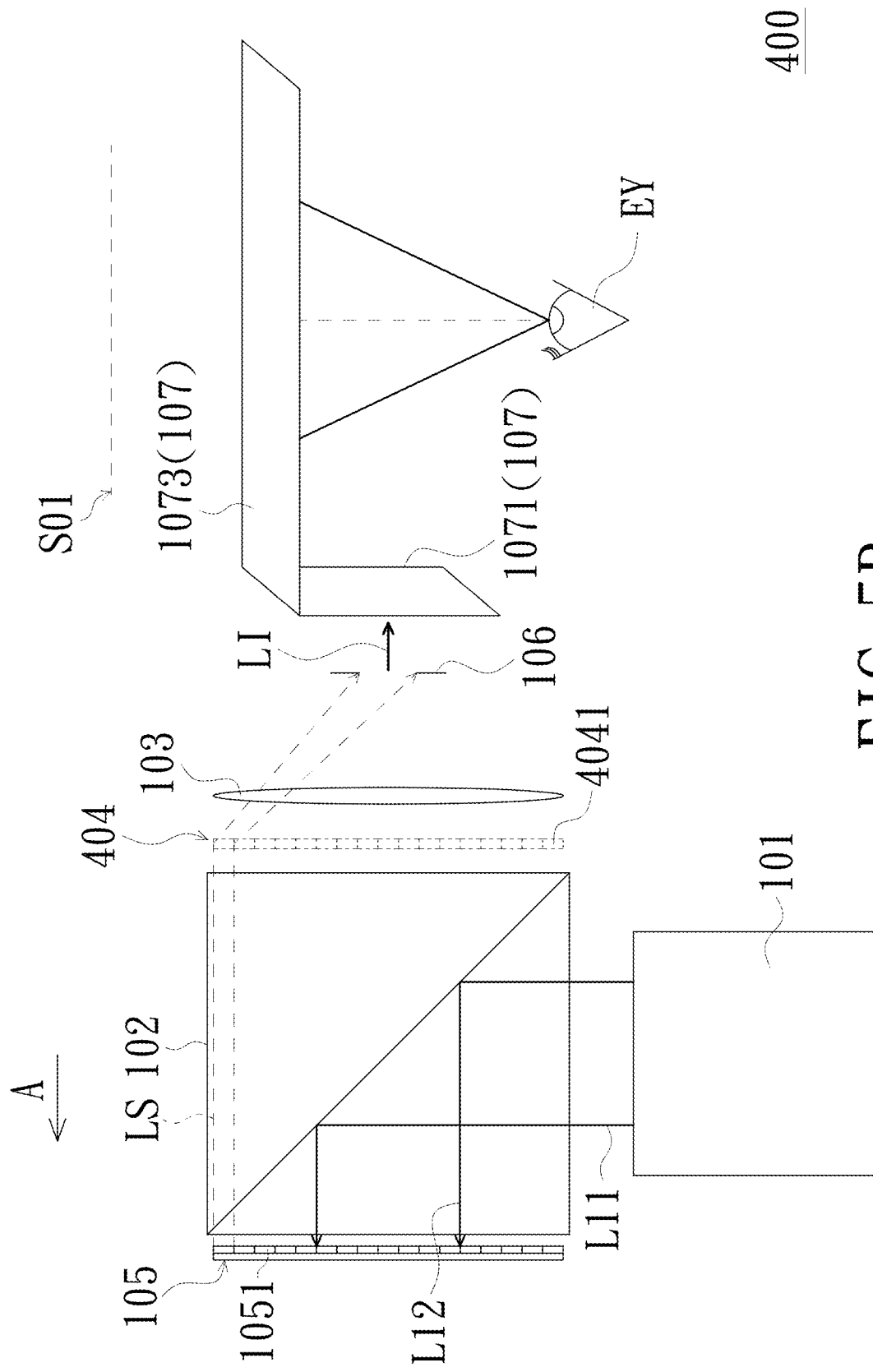

FIG. 5A and FIG. 5B are schematic views of a display device in accordance with still another embodiment of the invention. Referring to FIG. 5A and FIG. 5B, in the embodiment, the display device 400 includes a light source 101, a light-directing element 102, a microlens array 404, a reflective display element 105, and an optical waveguide element 107. The display device 400 of the embodiment has a similar structure and function as the display device 200 shown in FIG. 1. The embodiment shown in FIG. 5A and FIG. 5B is different from the embodiment shown in FIG. 1 in that the microlens array 404 is a spatial light modulator (SLM), and the microlenses 4041 have variable focal lengths, that is, each microlens 4041 of the microlens array 404 of the embodiment can adjust its focal length. In the embodiment, each microlens 4041, for example, could be implemented by a liquid crystal light valve (LCLV), a liquid lens, a liquid crystal lens, or other focal length adjustable optical elements.

In the embodiments of FIGS. 5A and 5B, since the microlens array 404 can selectively adjust the focal length of each microlens 4041, the display device 400 could have a wider adjustment range. For example, in the embodiment of FIG. 5A, the microlens array 404 has a refractive power, and the display device 400 could form a virtual image S0 with depth of field. In the embodiment of FIG. 5B, the focal length of the microlens array 404 is adjusted to, for example, infinity (i.e., no refractive power), so that the virtual image S01 formed by the display device 400 may not have the depth of field. In this way, the display device 400 can improve the versatility and convenience of use by adjusting the focal length. It is worth to mention that in the embodiments of FIG. 5A and FIG. 5B, a first lens 103 may be also disposed between the aperture 106 and the microlens array 404 for converging the sub-image beams LS to the aperture 106.

Figure 6:
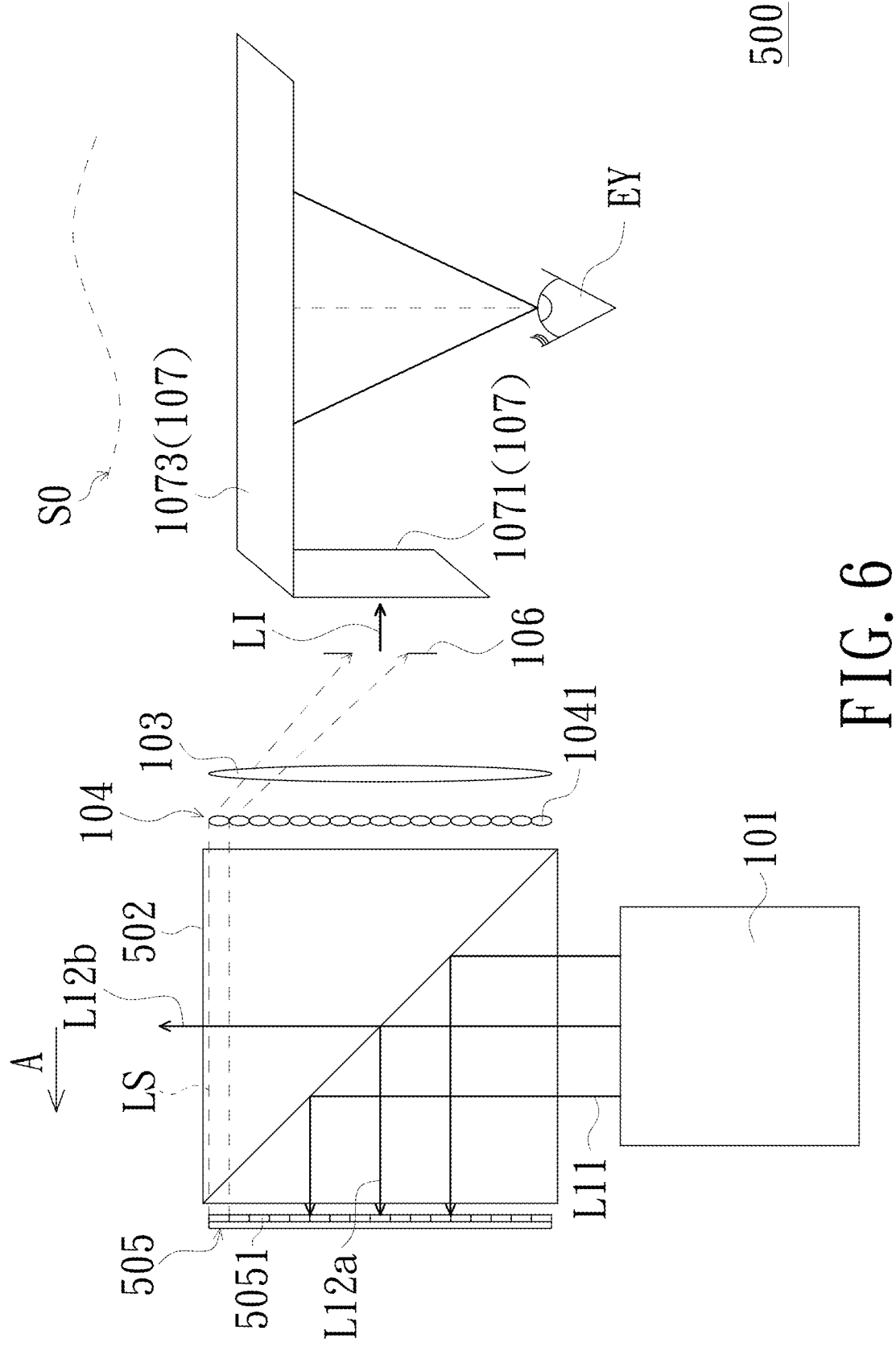
FIG. 6 is a schematic view of a display device in accordance with still another embodiment of the invention.

FIG. 6 is a schematic view of a display device in accordance with still another embodiment of the invention. Referring to FIG. 6, in the embodiment, the display device 500 includes a light source 101, a light-directing element 502, a microlens array 104, a reflective display element 505, and an optical waveguide element 107. The display device 500 of the embodiment has a similar structure and function as the display device 200 shown in FIG. 1. The embodiment shown in FIG. 6 is different from the embodiment shown in FIG. 1 in that the reflective display element 505 is a LCoS (Liquid crystal on silicon) display device, and the light-directing element 502 is a polarizing beam splitter (PBS). The lighting beam L11 includes a first polarized light beam and a second polarized light beam, and the light-directing element 502 reflects the first polarized light beam of the lighting beam L11 toward the first direction A to become the lighting beam L12a. The light-directing element 502 lets the second polarized light beam of the lighting beam L11 to pass through to become the lighting beam L12b. The polarization states of the first polarized light beam and the second polarized light beam of the lighting beam L11 are perpendicular to each other.

In this embodiment, after the micro-image units 5051 of the reflective display element 505 convert the lighting beam L12a into the sub-image beams LS, the polarization state of the sub-image beams LS reflected is changed, so that the polarization states of the sub-image beams LS reflected and the second polarized light beam are the same. Therefore, the sub-image beams LS could pass through the light-directing element 502 and converge to the aperture 106. Consequently, the image display can be realized by the display element 505 of LCoS in this embodiment. It is worth to mention that in this embodiment, a first lens 103 may be also disposed between the aperture 106 and the microlens array 404 for converging the sub-image beams LS to the aperture 106. In this embodiment, a light source lens (not shown in FIG. 6) may be also provided between the light source 101 and the light-directing element 502. The focal length of the light source lens is positive, so that the lighting beam L11 provided by the light source 101 pass through the light source lens to become the collimated light beam, and the lighting beam L12a projected by the light-directing element 502 toward the first direction A could become the collimated light beam. In addition, in other embodiments, the focal length of the light source lens is negative, so that the lighting beam L11 provided by the light source 101 pass through the light source lens to become the collimated light beam, and the lighting beam L12a projected by the light-directing element 502 toward the first direction A could become the collimated light beam.

Figure 7:
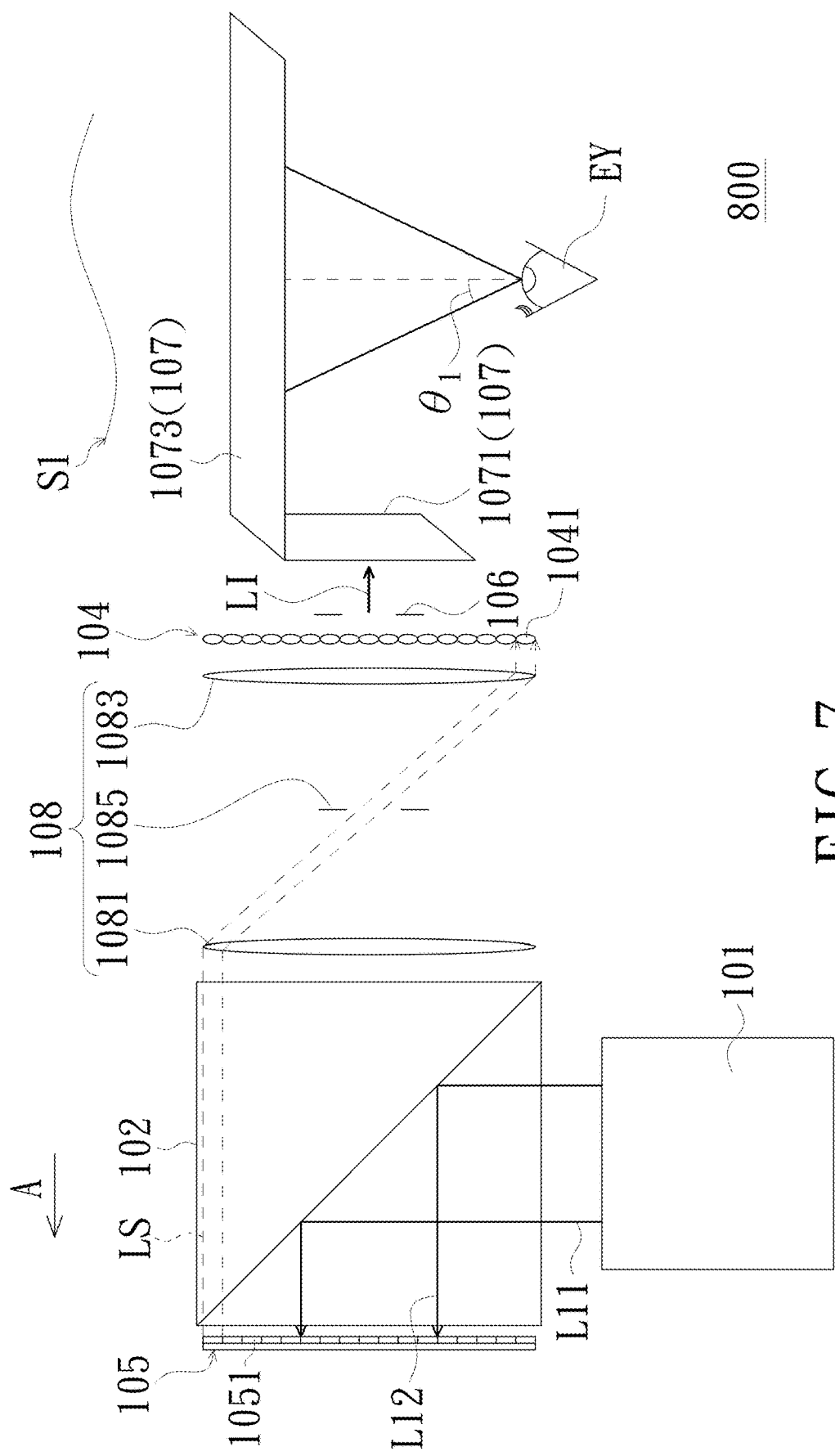
FIG. 7 is a schematic view of a display device in accordance with still another embodiment of the invention.

FIG. 7 is a schematic view of a display device in accordance with still another embodiment of the invention. Referring to FIG. 7, in the embodiment, the display device 800 includes a light source 101, a light-directing element 102, a microlens array 104, a reflective display element 105, an optical waveguide element 107, and a lens system 108. The display device 800 of the embodiment has a similar structure and function as the display device 200 shown in FIG. 1. The embodiment shown in FIG. 7 is different from the embodiment shown in FIG. 1 in that the display device 800 further includes a lens system 108, and the lens system 108 is disposed between the microlens array 104 and the light-directing element 102. The lens system 108 is configured to convert the sub-image beams LS penetrating the light-directing element 102 into the image beam LI. Therefore, after the optical waveguide element 107 transmits the image beam LI to the eye EY of the user, the eye EY of the user could see the virtual image S1, so that the user can see the image with depth feeling. In this embodiment, the lens system 108 includes a lens 1081 and a lens 1083 as an example, and the lens system 108 may further include an aperture 1085, to which the invention is not limited.

Figure 8:
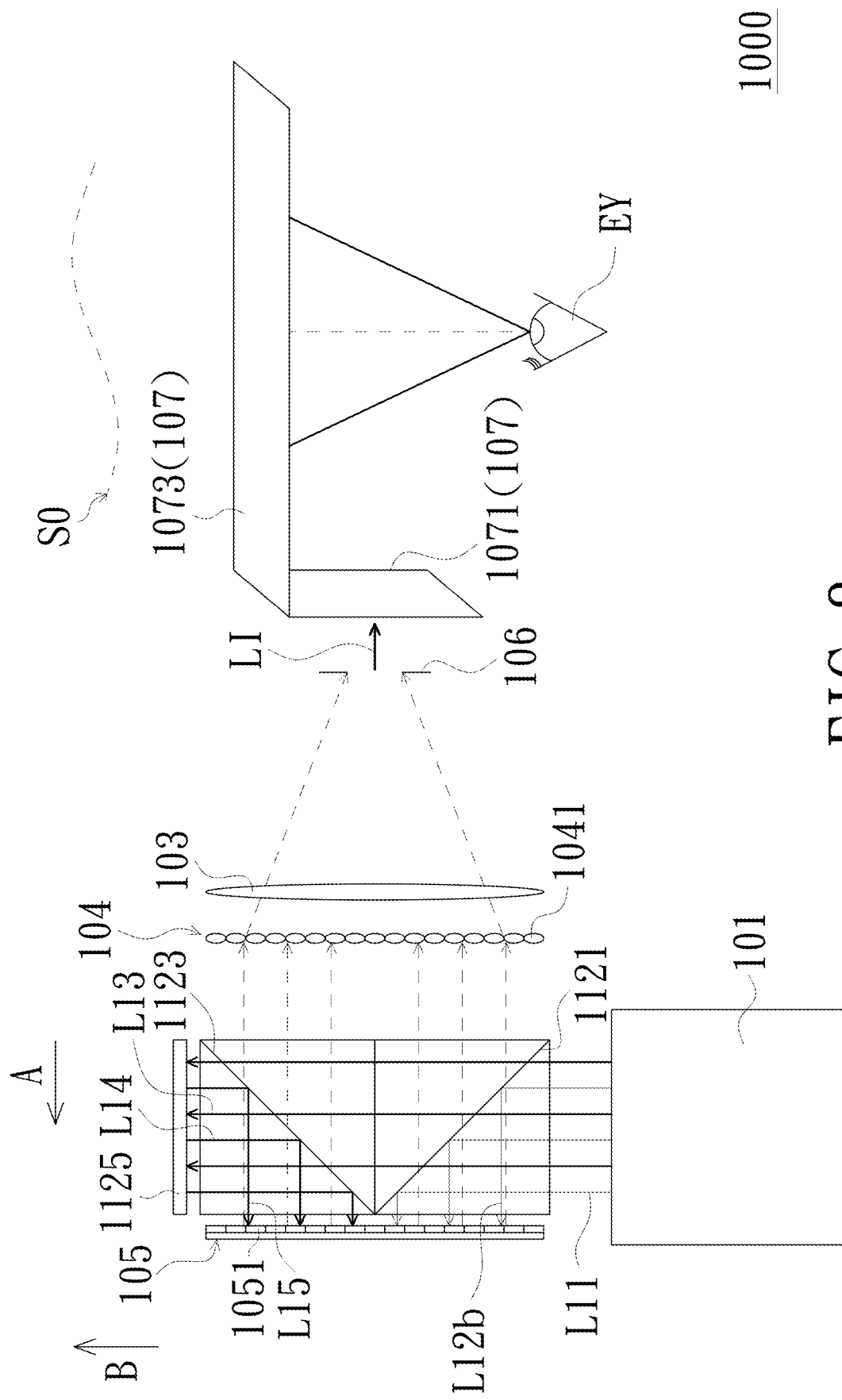
FIG. 8 is a schematic view of a display device in accordance with still another embodiment of the invention.

FIG. 8 is a schematic view of a display device in accordance with still another embodiment of the invention. Referring to FIG. 8, in the embodiment, the display device 1000 includes a light source 101, a light-directing element 112, a microlens array 104, a reflective display element 105, and an optical waveguide element 107. The display device 1000 of the embodiment has a similar structure and function as the display device 200 shown in FIG. 1. The embodiment shown in FIG. 8 is different from the embodiment shown in FIG. 1 in that the light-directing element 112 includes a first light splitting element 1121 and a second light splitting element 1123. The first splitting element 1121 and the second light splitting element 1123 are arranged along a second direction B, wherein the first splitting element 1121 is disposed between the light source 101 and the second light splitting element 1123, and the second direction B is perpendicular to the first direction A. The first light splitting element 1121 reflects a first portion of the lighting beam L11 provided by the light source 101 and projects toward the first direction A to become the lighting beam L12b. The first light splitting element 1121 lets a second portion (i.e., the lighting beam L13) of the lighting beam L11 to pass through and transmit to the second light splitting element 1123. The second light splitting element 1123 lets the lighting beam L13 to pass through and transmit to a polarization reflector 1125, and the polarization reflector 1125 reflects the lighting beam L13 to the second light splitting element 1123 to become the lighting beam L14. The second light splitting element 1123 projects the lighting beam L14 reflected by the polarization reflector 1125 toward the first direction A, so that the purpose of making the lighting beam L11 provided by the light source 101 to be projected to the reflective display element 105 is achieved. The light-directing element 112 including the first light splitting element 1121 and the second light splitting element 1123 can reduce the volume of the display device 1000 and increase the effective utilization of the lighting beam.

In other embodiments of the invention, the first light splitting element 1121 and the second light splitting element 1123 of the light-directing element 112 could be polarizing beam splitters, the polarization reflector 1125 could be a polarization reflector, and the reflective display element 105 could be a LCoS display device. The lighting beam L11 includes a first polarized light beam and a second polarized light beam, and the polarization states of the first polarized light beam and the second polarized light beam are perpendicular to each other. The first light splitting element 1121 and the second light splitting element 1123 could reflect the light beam with the same polarization state as the first polarized light and let the light beam with the same polarization state as the second polarized light to pass through. The polarization reflector 1125 can reverse the polarization state of the light beam reflected, so that the image display can be realized by the reflective display element of LCoS. The operation principle of the first light splitting element 1121 and the second light splitting element 1123 is similar to that of the light-directing element 502 shown in FIG. 6, and details are not described again.

In summary, according to the display device of the embodiment of the invention, by disposing a light-directing element, the thickness and weight of the display device can be greatly reduced, the field of view can be improved, and the sharpness of the image can be improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first direction, the second direction, the first lens, the first polarized light beam, the second polarized light beam, the first surface, the second surface, the first light splitting element, and the second light splitting element are only used for distinguishing various elements and do not limit the number of the elements.

What is claimed is:

1. A display device, comprising a light source, a light-directing element, a reflective display element, a microlens array, and a first lens, wherein
the light source is adapted to provide a lighting beam,
the light-directing element is disposed on a transmission path of the lighting beam for projecting the lighting beam toward a first direction,
the reflective display element is configured to receive the lighting beam projected from the light-directing element, the reflective display element comprises a plurality of micro-image units, wherein each micro-image unit converts the lighting beam into a sub-image beam and reflects the sub-image beam;
the microlens array is disposed on a transmission path of the sub-image beams, wherein the light-directing element is located between the microlens array and the reflective display element, the microlens array comprises a plurality of microlenses, and the microlenses correspond to the micro-image units, respectively;
the first lens is disposed on one side of the microlens array, wherein the microlens array is located between the first lens and the light-directing element, each sub-image beam passes through the light-directing element and is projected to the first lens by corresponding microlens and transmitted to an aperture, and the sub-image beams pass through the aperture to form an image beam.

2. The display device according to claim 1, further comprising at least one optical waveguide element, wherein the sub-image beams pass through the aperture and form the image beam, and the at least one optical waveguide element is located on the transmission path of the image beam.

3. The display device according to claim 1, wherein the light-directing element comprises a first surface, a second surface opposite to the first surface, and at least one incident surface connecting the first surface and the second surface, the second surface is disposed between the reflective display element and the first surface, the lighting beam provided by the light source enters the light-directing element through the incident surface, the light-directing element comprises a reflective element, the reflective element comprises a plurality of reflective surfaces inclined with respect to the second surface, and the reflective element is configured to change the transmission direction of at least a portion of the lighting beam, so that the lighting beam is projected to the reflective display element.

4. The display device according to claim 3, wherein the reflective element is a polarizing beam splitter film, the reflective display element is a Liquid crystal on silicon display device, the lighting beam comprises a first polarized light beam and a second polarized light beam, the reflective element is configured to change the transmission direction of at least a portion of the first polarized light beam, so that the first polarized light beam is projected to the reflective display element, the reflective element lets the second polarized light beam to pass through, and the polarization states of the first polarized light beam and the second polarized light beam are perpendicular to each other.

5. The display device according to claim 4, wherein the display device further comprises a polarizer and a reflective polarizer, the polarizer is disposed between the light source and the light-directing element, the first surface is located between the reflective polarizer and the second surface, the polarizer lets the light beam with the same polarization state as the first polarized light beam to pass through, and the reflective polarizer lets the light beam with the same polarization state as the second polarized light beam to pass through.

6. The display device according to claim 1, wherein the aperture is provided with a physical aperture device.

7. The display device according to claim 1, wherein the microlens array is a spatial light modulator, and the microlenses have variable focal lengths.

8. The display device according to claim 1, wherein the reflective display element is a Liquid crystal on silicon display device.

9. The display device according to claim 8, wherein the light-directing element is a polarizing beam splitter, the lighting beam comprises a first polarized light beam and a second polarized light beam, the light-directing element reflects the first polarized light beam toward the first direction, the light-directing element lets the second polarized light beam to pass through, and the polarization states of the first polarized light beam and the second polarized light beam are perpendicular to each other.

10. The display device according to claim 1, wherein the reflective display element is a Digital Micromirror Device.

11. The display device according to claim 10, wherein the light-directing element is a partially-penetrating-and-partially-reflecting element.

12. The display device according to claim 1, wherein a lens is disposed between the light source and the light-directing element, and the focal length of the lens is positive or negative.

13. The display device according to claim 1, wherein a lens system is disposed between the microlens array and the light-directing element, and the lens system is configured to convert the sub-image beams that pass through the light-directing element into the image beam.

14. The display device according to claim 1, wherein the light-directing element comprises a first light splitting element and a second light splitting element, the first splitting element and the second light splitting element are arranged along a second direction, the second direction is perpendicular to the first direction, the first light splitting element reflects a first portion of the lighting beam provided by the light source and projects toward the first direction, the first light splitting element lets a second portion of the lighting beam to pass through and transmit to the second light splitting element, the second light splitting element lets the second portion of the lighting beam to pass through and transmit to a polarization reflector, the polarization reflector reflects the second portion of the lighting beam to the second light splitting element, and the second light splitting element projects the second portion of the lighting beam reflected by the polarization reflector toward the first direction.

* * * * *